United States Patent [19]

Uejima et al.

[11] 4,323,458
[45] Apr. 6, 1982

[54] PROCESS FOR REMOVING HEAVY-METAL IONS FROM AQUEOUS SOLUTION

[75] Inventors: Hiroyuki Uejima, Nara; Masahide Hirai, Kyoto; Tsutomu Sakaida, Uji, all of Japan

[73] Assignee: Unitika Ltd., Hyogo, Japan

[21] Appl. No.: 180,056

[22] Filed: Aug. 20, 1980

Related U.S. Application Data

[62] Division of Ser. No. 941,355, Sep. 11, 1978, Pat. No. 4,266,045.

[30] Foreign Application Priority Data

Sep. 12, 1977 [JP]  Japan ................................ 52/110099

[51] Int. Cl.$^3$ .............................................. C02F 1/28
[52] U.S. Cl. .................................................. 210/688
[58] Field of Search ......................................... 210/688

[56] References Cited

U.S. PATENT DOCUMENTS

| | | | |
|---|---|---|---|
| 2,259,503 | 10/1941 | Wassenegger et al. | 521/35 |
| 2,625,530 | 1/1953 | Doelling et al. | 528/219 |
| 2,753,316 | 7/1956 | Campbell | 260/29.3 |
| 3,936,399 | 2/1976 | Hirai et al. | 528/161 |
| 4,028,284 | 6/1977 | Yokota et al. | 528/162 |
| 4,250,031 | 2/1981 | Uejima et al. | 210/688 |
| 4,284,512 | 8/1981 | Hodgkin | 210/688 |

*Primary Examiner*—Lester L. Lee
*Attorney, Agent, or Firm*—Sughrue, Mion, Zinn, Macpeak & Seas

[57] ABSTRACT

An etherified phenolic chelate resin prepared by stabilizing and protecting the chelate groups of a phenolic chelate resin and then converting some or all of the phenolic hydroxyl groups into either groups; a process for the production of the etherified phenolic chelate resin; and a method for separating a heavy metal ion from an aqueous solution having a pH of at least 7 by using this etherified phenolic chelate resin.

16 Claims, No Drawings

PROCESS FOR REMOVING HEAVY-METAL IONS FROM AQUEOUS SOLUTION

This is a division of application Ser. No. 941,355, filed Sept. 11, 1978, now U.S. Pat. No. 4,266,045.

BACKGROUND OF THE INVENTION

1. Field of the Invention

This invention relates to an etherified phenolic chelate resin, to a process for the production of the etherified phenolic chelate resin, and to a method for using the etherified phenolic chelate resin. More specifically, the invention relates to an etherified phenolic chelate resin prepared by stabilizing and protecting the chelate groups of a phenolic chelate resin and converting some or all of the phenolic hydroxyl groups into ether groups; to a process for the production of the etherified phenolic chelate resin; and to a method for adsorptively separating a heavy metal ion from an aqueous solution having a pH of about 7 to about 13 by using the etherified phenolic chelate resin.

2. Description of the Prior Art

Various chelate resins have been used for adsorption, removal and recovery of heavy metal ions. The phenolic chelate resins described in U.S. Pat. Nos. 3,936,399 and 4,024,244 have been widely produced and utilized commercially because they have high hydrophilicity, superior physical and mechanical stability and a high rate of adsorption of heavy metal ions, and then can be regenerated for re-use. Chelate resins of this type which are based on a phenol-aldehyde condensate have the defect of insufficient chemical stability such as alkali resistance, acid resistance, heat resistance and oxidation resistance at high temperatures because of the effect of the phenolic hydroxyl groups.

Purification of brine for production of sodium hydroxide has generally been effected by a flocculation precipitating method based on the addition of alkaline agents. This method comprises adding an alkaline agent to brine to precipitate metals such as calcium, magnesium and iron present in the brine in the form of a difficultly soluble hydroxide or carbonate thereof. In this method, however, the hydroxides or carbonates formed are still soluble to some extent, and the purified brine still inevitably contains about 2 to 30 mg/liter of calcium, about 0.5 to 5 mg/liter of magnesium and about 0.5 mg/liter of iron. (All concentrations are as metals, hereinafter the same.) Removal of such minor amounts of metals requires an apparatus of a large size and large quantities of additives, and is extremely uneconomical.

A method is also known which comprises removing impurities of brine for production of sodium hydroxide using a chelate resin. For example, U.S. Pat. No. 4,060,465 discloses a method for removing impurities in brine for production of sodium hydroxide using a chelate resin whose matrix is a styrene-divinylbenzene copolymer, a styrene-butadiene copolymer, an epichlorohydrin polymer, etc. No disclosure, however, is present in U.S. Pat. No. 4,060,465 as to use of a phenol-type chelate resin.

Japanese Patent Application (OPI) No. 86100/76 (The term "OPI" as used herein refers to a "published unexamined Japanese patent application".) discloses a method for electrolyzing purified brine containing less than 0.5 gm/liter of calcium ion, less than 0.1 mg/liter of magnesium ion, and less than 0.3 mg/liter of iron ion obtained by passing brine through a chelate resin (using a styrene/divinylbenzene copolymer as a resin matrix). Japanese Patent Application (OPI) No. 86100/76 is silent on etherified phenolic chelate resins. When brine is purified using a conventional phenolic chelate resin, the chemical stability (e.g., alkali resistance) of the phenolic chelate resin at high temperatures is not sufficient because of the influence of the phenolic hydroxyl groups, and the phenolic chelate resin cannot be regenerated.

Generally, the phenolic hydroxyl groups of a phenol-formaldehyde resin are converted into ether groups by various methods. However, no such conversion has ever been performed on phenolic chelate resins.

The conventional etherification reaction of phenol-formaldehyde resins, as typically shown in U.S. Pat. Nos. 2,625,530 and 2,753,316, for example, comprises converting the phenolic hydroxyl groups into the alkali metal salts thereof using sodium hydroxide or potassium hydroxide, and reacting the alkali metal salt with an equimolar or excessive molar amount, based on the phenolic hydroxyl groups, of an etherifying agent. However, when a phenolic chelate resin is etherified using such a known etherification reaction, the chelate groups will be destroyed because of the high chemical reactivity of the chelate groups. As a result, the resulting chelate resin has reduced adsorptivity, and cannot be used commercially.

SUMMARY OF THE INVENTION

An object of this invention is to provide an etherified phenolic chelate resin which has superior chemical stability such as alkali resistance, acid resistance, thermal resistance and oxidation resistance at high temperatures, and which can be regenerated for re-use; and to provide a process for producing the resin.

Another object of this invention is to provide a method for adsorbing a heavy metal ion from an aqueous solution having a pH of about 7 to about 13 by using the etherified phenolic chelate resin, and removing the heavy metal ion.

Extensive investigations have now been made in order to achieve these objects. These investigations have led to the discovery that a phenol-type chelate resin having adsorbed thereto a metal ion having the ability to form a complex has a strong chelate-bondability with the metal ion, and even when the phenol-type chelate resin chelated to the metal ion is etherified in an ordinary alkaline aqueous solution, liberation of the metal ion hardly occurs; and therefore, that the reaction proceeds while the chelate groups are stabilized and protected, and the phenolic hydroxyl groups of the phenol-type chelate resin can be etherified without reducing the chelating ability of the phenol-type chelate resin. It has also been found that the resulting etherified phenol-type chelate resin has superior chemical stability such as alkali resistance at high temperatures, and excellent ability to capture a heavy metal ion in a high pH region. The present invention has been accomplished as a result of these discoveries.

The present invention thus provides an etherified phenolic chelate resin resulting from the etherification of some or all of the phenolic hydroxyl groups of a phenolic chelate resin with an etherifying agent.

The invention also provides a process for producing an etherified phenolic chelate resin, which comprises causing a metal ion having the ability to form a complex with a phenolic chelate resin to be adsorbed by a phenolic chelate resin to stabilize and protect the chelate groups of the phenolic chelate resin, and then etherifying the phenolic hydroxyl groups of the phenolic chelate resin.

The invention further provides an adsorptive treatment method, which comprises contacting an aqueous solution containing a heavy metal ion and having a pH of about 7 to about 13 with the etherified phenolic chelate resin described above whereby the heavy metal ion is adsorbed by the etherified phenolic chelate resin and removed from the aqueous solution.

DETAILED DESCRIPTION OF THE INVENTION

The etherified phenolic chelate resin of this invention can be obtained by a simple manufacturing process, and has far superior chemical stability such as alkali resistance at high temperatures to conventional phenolic chelate resins and excellent ability to capture heavy metal ions. The etherified phenolic chelate resin of this invention is, therefore, effective for the adsorptive separation of a heavy metal ion from an aqueous solution having a pH of about 7 to about 13. When the etherified phenolic chelate resin is regenerated repeatedly at high temperatures, no reduction in adsorptivity for heavy metal ions occurs.

The etherified phenolic chelate resin of this invention can be produced, for example, using the following procedure. First, a phenolic chelate resin (H-type terminal groups or alternatively Na type, K type and Ca type terminal groups can be employed in addition to H-type terminal groups) is immersed in deionized water, and an aqueous solution of sodium hydroxide of a concentration of about 1 to 40%, preferably 5 to 10%, by weight is added thereto. Alternatively, potassium hydroxide can be used to convert the terminal groups to K+ type terminal groups. With occasional stirring at room temperature (e.g., about 20°–30° C.), the terminal groups of the resin are converted to Na-type. Then, a metal ion having the ability to form a complex with the phenolic chelate resin is adsorbed by the resin.

This method can be practiced using a batch process or a continuous process, e.g., using a column of the chelate resin. Usually, a column method is used, and an aqueous solution of a metal of a concentration of about 50 to 10,000 mg/liter, preferably 100 to 1000 mg/liter, is passed through the column containing the phenolic chelate resin at a space velocity (SV) of 0.5 to 50, preferably 1 to 10, in an amount of about 2 to 5 times the adsorptivity of the phenolic chelate resin to cause the adsorption of the desired metal ion by the phenolic chelate resin. The adsorptivity of the phenolic chelate resin can be measured using a batchwise method. More specifically, the adsorptivity measured in the batchwise method is the amount (mg/g) of metal ion adsorbed per 3 g of the wet resin, for example, the value measured after immersing 0.1 g of the wet resin (Na type terminal groups), which has been washed sufficiently with water, with 50 ml of an aqueous solution containing 250 ppm of the metal ion, followed by agitation for 48 hours. The adsorptivity is determined then by the difference between the amount of metal ion present initially in the aqueous solution less the amount of metal ion remaining in the aqueous solution per gram of the wet resin.

Then, the phenolic hydroxyl groups of the phenolic chelate resin having the metal ion adsorbed thereon is etherified. The etherification reaction may be carried out using known methods. Preferably, however, sodium hydroxide or potassium hydroxide is added in an amount of about 0.8 to about 1.3 mol, preferably 0.9 mol to 1.2 mol, more preferably an equimolar amount, based on the total phenolic hydroxyl groups in the phenolic chelate resin in water or a mixture of water with a water-miscible organic solvent such as methanol, ethanol, n-propyl alcohol, dioxane, dimethyl sulfoxide, α-methypyrrolidone, or dimethylformamide (with the proportion of water being about 10 to 90% by volume, preferably 50 to 80% by volume), preferably in water. Then, an etherification agent in an amount of about 0.8 to 5.0 mol, preferably 1.0 to 3.0 mol, based on the total phenolic hydroxyl groups in the phenolic chelate resin is added thereto, and the mixture is reacted at about 20° to 150° C. for about 1 to 15 hours, preferably at 30° to 100° C. for 3 to 10 hours. Desirably, the pH of the reaction system is maintained at about 7 to 14, preferably 9 to 13. Hence, an aqueous solution of sodium hydroxide or potassium hydroxide of a concentration of about 10 to 30% by weight, preferably 15 to 25% by weight, is added to the water containing the phenolic chelate resin. When the pH of the reaction system is less than about 7 or greater than about 14, the phenolic hydroxyl groups are hardly etherified, and only the etherifying agent is hydrolyzed. The progress of the process of this invention can be monitored using various instrumental analytical techniques. The simplest method is to measure the amount of phenolic hydroxyl groups remaining using a neutralization titration method. Preferably, the amount of the phenolic hydroxyl groups converted to ether groups is about 20 to 100%.

The phenolic chelate resin used as a starting material in this invention denotes a resin of a matrix of a phenol-formaldehyde condensate (e.g., where the molar ratio of phenol groups to aldehyde groups is about 0.3 to about 0.7, preferably 0.4 to 0.6) and having introduced thereinto, as a functional group, a group derived from a polyalkylene polyamine of the formula (I)

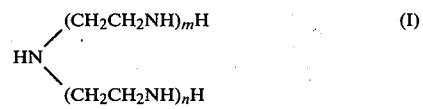

wherein m and n are integers of 1 to 5, such as diethylene triamine, triethylene tetramine, tetraethylene pentamine or pentaethylene hexamine; from a iminodi-aliphatic carboxylic acid of the formula (II)

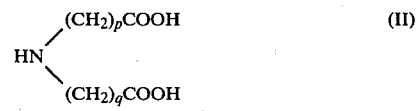

wherein p and q are integers of 1 to 3, such as iminodiacetic acid, iminodipropionic acid or iminodibutyric acid; from an aminocarboxylic acid which is the reaction product containing 3 to 11 amino functional groups, 1 to 12 carboxylic functional groups and 2 to 10 ethylene groups formed between a polyalkylene polyamine of the formula (I) above and a haloacetic acid, e.g., chloroacetic acid, bromoacetic acid and iodoacetic acid; from an alcohol amine of the formula (III)

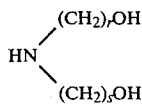 (III)

wherein r and s are integers of 1 to 3, such as diethanolamine, dipropanolamine or dibutanolamine; and ureas such as urea, ethylurea, methylurea and thiourea. A suitable amount of chelate groups introduced is about 0.3 to about 0.7 mole, preferably 0.4 to 0.6 mole, per mole of phenol groups.

The phenolic chelate resin used as a starting material in this invention can be prepared by crosslinking a phenol, an aldehyde and a phenol compound having at least one of the functional groups described above introduced into it to a three-dimensional structure in accordance with the methods described in, e.g., U.S. Pat. Nos. 3,936,399 and 4,024,244.

Examples of suitable etherifying agents which can be used in the present invention are alkyl halides of the general formula (IV)

$$C_aH_{2a+1}X \quad (IV)$$

wherein X is a halogen atom, and a is an integer of 1 to 5, such as methyl iodide, ethyl iodide, methyl bromide and ethyl bromide;

dialkyl sulfates of the general formula (V)

$$(C_aH_{2a+1})_2SO_4 \quad (V)$$

wherein a represents an integer of 1 to 5, such as dimethyl sulfate and diethyl sulfate;

alkyl esters of aromatic sulfonic acids of the general formula (VI)

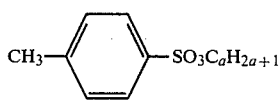 (VI)

wherein a represents an integer of 1 to 5, such as methyl p-toluenesulfonate and ethyl p-toluenesulfonate;

haloacetic acids such as monochloroacetic acid, monobromoacetic acid and monoiodoacetic acid, and the sodium or potassium salts thereof;

alkylene oxides of the general formula

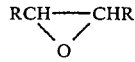

wherein R represents an alkyl group having 1 to 3 carbon atoms, such as ethylene oxide and propylene oxide;

halohydrins of the general formula (VII)

$$HOC_bH_{2b}X \quad (VII)$$

wherein X represents a halogen atom, and b represents an integer of 1 to 3, such as ethylene chlorohydrin, ethylene bromohydrin and ethylene iodohydrin; and allyl chloride, allyl bromide, allyl iodide, benzyl chloride, benzyl bromide, and benzyl iodide. Of these etherifying agents described above, haloacetic acids, halohydrins, alkyl halides and dialkyl sulfates are especially effective. When the chelate group is an iminodi-aliphatic carboxylic acid or an aminocarboxylic acid, the etherifying agent preferably is a haloacetic acid or halohydrin; and when the chelate group is an amine or a urea, the etherifying agent preferably is an alkyl halide or dialkyl sulfate.

Examples of metal ions having the ability to form a complex with a phenolic chelate resin which can be separated in the present invention include light metals such as magnesium, calcium or aluminum, and heavy metals such as vanadium, chromium, manganese, iron, cobalt, nickel, copper, zinc, cadmium, tin, lead, bismuth and antimony. Copper and calcium can be especially effectively separated in the present invention.

The etherified phenolic chelate resin of the present invention has superior chemical stability such as alkali resistance, acid resistance, heat stability and oxidation resistance at high temperatures, e.g., about 70°–90° C., to conventional phenolic chelate resins, and also possesses better ability to capture heavy metals. The selective adsorptivity of the etherified phenolic chelate resin for heavy metal ions differs depending upon the pH and temperature of the aqueous solution containing the heavy metal ions, the type and concentration of ion(s) copresent, etc. Generally, the degree of selectivity, in decreasing order of selectivity, is mercury>copper->aluminum>iron>zinc>lead>nickel>calcium>-magnesium>sodium. The etherified phenolic chelate resin of the present invention is effective for adsorptive removal of a heavy metal ion from an aqueous solution having a pH of about 7 to about 13.

Treatment of an aqueous solution containing a heavy metal ion with the etherified phenolic chelate resin of this invention can be performed, for example, by contacting an aqueous solution containing a heavy metal ion having a pH of about 7 to about 13 with the etherified phenolic chelate resin at about 10° to about 90° C., preferably 20° to 80° C. Contacting can be ensured using either a batch method in which the etherified phenolic chelate resin is simply mixed with the aqueous solution containing the heavy metal ion and the mixture shaken, and a continuous method, e.g., using a column in which the etherified phenolic chelate resin is packed in a column and the aqueous solution containing the heavy metal ion is passed through the column. Generally, the latter method is preferred.

The time of contact of the aqueous solution containing the heavy metal ion with the etherified phenolic chelate resin of the present invention will vary depending, for example, on the amount of the etherified phenolic chelate resin, the composition of the aqueous solution to be treated, the rate of passing the aqueous solution through the column, etc. Generally, if the amount of the etherified phenolic chelate resin is 100 g, a suitable contact time for the aqueous solution with the etherified phenolic chelate resin is about 5 minutes to 30 days, preferably 30 minutes to 10 days.

When the etherified phenolic chelate resin of the present invention has adsorbed a heavy metal ion and the adsorptivity reaches saturation, the etherified phenolic chelate resin is treated with an aqueous solution of a mineral acid, such as hydrochloric acid, nitric acid, or sulfuric acid, of a concentration of about 5 to 20% by weight. As a result, the heavy metal ion readily desorbs from the etherified phenolic chelate resin and dissolves in the aqueous mineral acid solution. The time required for regeneration will vary depending on the amount of the etherified phenolic chelate resin to be regenerated. If the amount of the etherified phenolic chelate resin to be regenerated is 100 g and the etherified phenolic chelate resin is regenerated with a 10% by weight aqueous solution of sulfuric acid, the regeneration time is about 2 to 120 minutes, more generally 5 to 60 minutes. The regenerating temperature is about 10° to 50° C., preferably 15° to 30° C. The etherified phenolic chelate resin from which the heavy metal ion has been separated can be used as such without further treatment. Preferably, however, this resin is treated with an aqueous solution of an alkali, such as sodium hydroxide or calcium hydroxide, of a concentration of about 4 to 10% by weight, or this resin is washed with water, prior to re-use. No reduction in the ability to adsorb a heavy metal ion occurs due to the regeneration.

The etherified phenolic chelate resin of this invention can be employed, for example, in systems requiring high purity, e.g., brine used for electrolysis of aqueous solutions of alkali salts in the production of sodium hydroxide. When the brine for the production of sodium hydroxide is treated using the etherified phenolic chelate resin of this invention, the treated brine contains less than about 0.3 mg/liter of calcium ion, less than about 0.3 mg/liter of magnesium ion and less than about 0.1 mg/liter of iron ion. The treated brine, therefore, has a quality satisfactory for production of sodium hydroxide using the diaphragm method. More specifically, when a column with an inside diameter of 13 mm is filled with 100 ml of the etherified phenolic chelate resin (Na-type terminal groups) of the present invention, and a concentrated aqueous solution of sodium chloride containing 300 g/liter of sodium chloride, 14 mg/liter of calcium ion, 2 mg/liter of magnesium ion and 1 mg/liter of iron ion and having a pH of 10 and a temperature of 60° C. is passed through the column at a rate of 1000 ml per hour, the concentrated sodium chloride solution thus treated contains less than 0.3 mg/liter of calcium ion, less than 0.3 mg/liter of magnesium ion and less than 0.1 mg/liter of iron ion, and the calcium ion, the magnesium ion and the iron ion in the aqueous sodium chloride solution have thus been adsorbed and removed almost completely.

The treating method of this invention using an adsorption technique is also useful for the purification of sea water in a sea water desalting process, recovery of zinc from effluents from the manufacture of polyvinyl alcohol fibers or rayon, recovery of heavy metals and sodium chloride from the smoke wash effluent of rubbish incineration plants, and removal of heavy metal ions from an alkaline aqueous solution during the manufacture of alkali storage batteries.

The etherified phenolic chelate resin of this invention can be obtained using a simple manufacturing method as described in detail hereinabove, and exhibits a superior effect in capturing heavy metals and excellent chemical stability such as alkali resistance at high temperatures. Since the etherified phenolic chelate resin of this invention can be regenerated for re-use in a simple treatment with an acid and an alkali, the etherified phenolic chelate resin of this invention has a high utilitarian value, and can be used in applications different from present applications where conventional phenolic chelate resins have been used.

The following Examples are given to illustrate the present invention more specifically. All parts and percentages in these examples are by weight, unless otherwise indicated.

EXAMPLE 1

50 ml of a phenolic chelate resin (Unicellex UR-10, a trademark for a product of Unitika Limited; functional groups, iminodiacetic acid; terminal groups, Na type) was placed in 300 ml of a 7% aqueous solution of calcium chloride and stirred at room temperature for 2 hours to cause the adsorption of calcium by the phenolic chelate resin. A 500 ml three-necked flask equipped with a condenser was charged with 45 ml of the phenolic chelate resin with calcium adsorbed thereon, 55 parts of a 10% aqueous solution of sodium hydroxide and 16.1 parts of ethylene chlorohydrin, and the mixture was stirred at 50° C. for 1 hour. Then, the temperature was increased to 80° C., and the reaction was continued for 5 hours to complete the etherification. The degree of etherification of the resulting phenolic chelate resin was 60%.

The amount of zinc which was adsorbed by this resin was 0.6 mol/liter of resin.

When this resin was treated in an aqueous solution of sodium hydroxide having a pH of 12 at 80° C. for 100 hours, and then the amount of zinc adsorbed was measured, the amount was found to be 0.55 mol/liter of resin.

COMPARATIVE EXAMPLE 1

The amount of zinc which was adsorbed by the phenolic chelate resin, Unicellex UR-10, as described in Example 1, was 0.6 mol/liter of resin.

Without adsorbing calcium ion on this phenolic chelate resin, the resin was etherified under the same conditions as described in Example 1.

The amount of zinc which was adsorbed by the resulting resin was 0.39 mol/liter of resin.

When the amount of the zinc adsorbed was measured after treating this resin with an aqueous solution of sodium hydroxide having a pH of 12 at 80° C. for 20 hours, the amount adsorbed was found to be 0.35 mol/liter of resin.

EXAMPLE 2

A flowable resin solution was prepared by reacting 39.9 parts of iminodiacetic acid, 62.7 parts of phenol, 56.7 parts of a 37% aqueous solution of formaldehyde, and 59.0 parts of 98% sulfuric acid. To the resin solution were added 10.3 parts of a 40% aqueous solution of diethylene triamine and 86.5 parts of a 37% aqueous solution of formaldehyde, and suspension polymerization was performed using perchloroethylene as a suspending medium.

59.5 ml of the resulting resin was packed into a glass tube having an inside diameter of 13 mm. An aqueous solution containing 100 mg/liter, calculated as copper, of copper sulfate was prepared, and passed through the column at a rate of SV=10. The phenolic chelate resin having the copper adsorbed thereon was etherified under the same conditions as described in Example 1. The degree of etherification of the resulting resin was 50%.

The amount of calcium which was adsorbed by the resulting resin was 0.68 mol/liter of resin.

When the amount of calcium adsorbed by this resin was measured after treating the resin in an aqueous solution of sodium hydroxide having a pH of 12 at 80° C. for 150 hours, the amount was found to be 0.65 mol/liter of resin.

EXAMPLE 3

34.2 parts of phenol, 29.2 parts of triethylene tetramine, 33.9 parts of a 37% aqueous solution of formaldehyde and 135.6 parts of a 50% aqueous solution of sulfuric acid were reacted for 6 hours at 70° C. to produce a flowable resin solution. To the resin solution obtained was added 41.4 parts of a 37% aqueous solution of formaldehyde, and suspension polymerization was performed in a mixture of carbon tetrachloride and monochlorobenzene (1:1 by volume) as a suspending medium. Copper was adsorbed by the resulting resin in the same manner as described in Example 2. A 500 ml three-necked flask equipped with a condenser was charged with 60 ml of the phenolic chelate resin having the copper adsorbed thereon, 24.1 parts of dimethyl sulfate and 191 parts of a 4% aqueous solution of sodium hydroxide, and these materials were reacted at room temperature for 3 hours. Then, the temperature was increased to 90° C., and the reaction was performed for 1 hour additionally to complete the etherification. The degree of etherification of the resulting resin was 80%.

The amount of copper which was adsorbed by the resulting resin was 0.45 mol/liter of resin.

When the amount of copper adsorbed by this resin was measured after treating the resin in an aqueous solution of sodium hydroxide having a pH of 12 at 80° C. for 200 hours, the amount was found to be 0.41 mol/liter of resin.

EXAMPLE 4

By repeating the same procedures as described in Example 1, a phenolic chelate resin having calcium adsorbed thereon was obtained. A 500 ml three-necked flask equipped with a condenser was charged with 65 ml of the resulting resin, 95 parts of a 7.5% aqueous solution of sodium hydroxide and 120 parts of a 40% aqueous solution of sodium monochloroacetate, and these materials were stirred at 70° C. for 0.5 hour.

Then, the temperature was increased to 90° C., and the pH of the reaction solution was maintained at 10 to 12. The reaction was performed for 10 hours additionally under these conditions to complete the etherification.

The amount of calcium which was adsorbed by the resulting resin was 0.73 mol/liter of resin.

When the amount of calcium adsorbed by this resin was measured after treating the resin in an aqueous solution of sodium hydroxide having a pH of 12 at 80° C. for 200 hours, the amount was found to be 0.7 mol/liter of resin.

EXAMPLE 5

60 ml of an etherified phenolic chelate resin obtained as described in Example 4 (terminal groups, Na type) was packed in a glass tube with an inside diameter of 13 mm. A concentrated sodium chloride solution containing 300 g/liter of NaCl, 20 mg/liter of $Ca^{2+}$ and 2 mg/liter of $Mg^{2+}$ and having a pH of 10 was passed through the glass tube at a solution temperature of 60° C. and a rate (SV) of 10.

The concentrations of the calcium and magnesium ions in the treated water were measured by atomic absorption analysis. The concentration of the calcium ion was found to be less than 0.3 mg/liter, and that of the magnesium ion to be less than 0.3 mg/liter.

When the above solution was passed ten times repeatedly through the resin, no reduction in adsorptivity of the resin was observed.

EXAMPLE 6

100 ml of an etherified phenolic chelate resin (terminal groups, Na type) obtained as described in Example 4 was packed in a glass column with an inside diameter of 13 mm. Pretreated brine was passed through the column at a brine temperature of 30° C. and a passing rate (SV) of 10 for 7 hours. The brine used contained 10.6 g/liter of $Na^+$, 1400 mg/liter of $Mg^{2+}$, 350 mg/liter of $Ca^{2+}$, 380 mg/liter of $K^+$, 19.0 g/liter of $Cl^-$, 2.6 g/liter of $SO_4^{2-}$ and minor amounts of $Sr^{2+}$, $HCO_3^-$, $Br^-$ and $F^-$ and had a pH of 7.0.

The amounts of magnesium and calcium so adsorbed by the resin were 0.45 mol/liter of resin and 0.30 mol/liter of resin, respectively.

EXAMPLE 7

56.4 parts of phenol, 40.0 parts of iminodiacetic acid, 53.5 parts of a 37% aqueous solution of formaldehyde and 60.0 parts of 98% sulfuric acid were reacted for 5 hours at 80° C. to form a flowable resin solution. To the resin solution were added 11.3 parts of tetraethylene pentamine, 68.1 parts of a 37% aqueous solution of formaldehyde and 7.6 parts of anhydrous sodium sulfate, and suspension polycondensation was performed in o-dichlorobenzene to form a resin.

Calcium was adsorbed by the resin in the same manner as described in Example 1. A 500 ml three-necked flask equipped with a condenser was charged with 100 ml of the resulting phenolic chelate resin having calcium adsorbed thereon, 50 parts of a 22.0% aqueous solution of sodium hydroxide and 200 parts of a 4.0% aqueous solution of sodium monochloroacetate, and the reaction was performed at 90° C. for 10 hours while maintaining the pH of the reaction solution at 10 to 12 to complete the etherification. The degree of etherification of the resulting resin was 50%.

The amount of calcium which was adsorbed by the resulting resin was 0.75 mol/liter of resin.

When the amount of calcium adsorbed by the resin was measured after treating the resin in an aqueous solution of sodium hydroxide at pH 12 for 200 hours at 80° C., the amount was found to be 0.72 mol/liter of resin.

EXAMPLE 8

100 ml of an etherified phenolic chelate resin (terminal groups, Na type) obtained as described in Example 7 was packed in a glass column having an inside diameter of 13 mm. The effluent from a polyvinyl alcohol fiber manufacturing plant was passed through the column for 4 hours at a rate (SV) of 20 while the effluent was maintained at 30° C. The effluent contained 20 mg/liter of $Zn^{2+}$, 125 mg/liter of $Ca^{2+}$, 12 mg/liter of $Mg^{2+}$ and 600 mg/liter of $Na^+$ and had a pH of 9.0.

The amount of zinc so adsorbed and removed was 0.70 mol/liter of resin, and the ratio of recovery of zinc was 95%.

When this procedure was repeated 10 times, no reduction in the adsorptivity of the resin was noted.

EXAMPLE 9

100 ml of an etherified chelate resin produced as described in Example 7 (terminal groups, Na type) was packed in a glass column having an inside diameter of 13 mm. The waste water from the washing of smoke from a rubbish incinerating plant, from which suspended solids had been removed by filtration, was passed through the column at a rate (SV) of 10 while maintaining the temperature of the waste water at 30° C. The waste water used contained 20 mg/liter of $Pb^{2+}$, 30 mg/liter of $Zn^{2+}$, 10 mg/liter of $Cd^{2+}$, 50 mg/liter of $Ca^{2+}$, 10 mg/liter of $Mg^{2+}$, 10 g/liter of $Na^+$ and minor amounts of $Cu^{2+}$ and $Al^{3+}$ and had a pH of 7.0.

The concentrations of $Pb^{2+}$, $Zn^{2+}$ and $Cd^{2+}$ in the treated waste water were all less than 0.1 mg/liter. The concentration of $Ca^{2+}$ was less than 0.3 mg/liter, and the concentration of $Mg^{2+}$ was less than 0.3 mg/liter.

While the invention has been described in detail and with reference to specific embodiments thereof, it will be apparent to one skilled in the art that various changes and modifications can be made therein without departing from the spirit and scope thereof.

What is claimed is:

1. A method for adsorptive treatment, which comprises contacting an aqueous solution containing a heavy metal ion and having a pH of about 7 to 13 with an etherified phenolic chelate resin comprising the product obtained on etherification of some or all of the phenolic hydroxyl groups of a phenolic chelate resin with an etherification agent, wherein the heavy metal is adsorbed by said phenolic chelate resin and removed from said aqueous solution.

2. The method of claim 1, wherein the aqueous solution is sea water.

3. The method of claim 1, wherein the aqueous solution is waste water resulting from the washing of smoke of a rubbish incineration plant which contains inorganic salts.

4. The method of claim 1, wherein the aqueous solution is an effluent from a plant for manufacturing polyvinyl alcohol fiber or rayon.

5. The method of claim 1, wherein the aqueous solution is an aqueous solution of salts for production of sodium hydroxide.

6. The method of claim 1, wherein the degree of etherification is about 20 to 100%.

7. The method of claim 1, wherein the chelate group of the phenolic chelate resin is selected from the group consisting of a polyalkylene polyamine group, an iminodi-aliphatic carboxylic acid group, an aminocarboxylic acid group, an alcoholamine group, and a urea group.

8. The method of claim 1, wherein the etherification agent is selected from the group consisting of haloacetic acid, halohydrins, alkyl halides and dialkyl sulfates.

9. The method of claim 1, wherein the etherification agent is a haloacetic acid, and the chelate group of the phenolic chelate resin is an aminocarboxylic acid group.

10. The method of claim 1, wherein the etherification agent is a haloacetic acid, and the chelate group of the phenolic chelate resin is an iminodi-aliphatic carboxylic acid group.

11. The method of claim 1, wherein the etherification agent is a halohydrin, and the chelate group of the phenolic chelate resin is an aminocarboxylic acid group.

12. The method of claim 1, wherein the etherification agent is a halohydrin, and the chelate group of the phenolic chelate resin is an iminodi-aliphatic carboxylic group.

13. The method of claim 1, wherein the etherification agent is an alkyl halide, and the chelate group of the phenolic chelate resin is an amine group.

14. The method of claim 1, wherein the etherification agent is an alkyl halide, and the chelate group of the phenolic chelate resin is a urea group.

15. The method of claim 1, wherein the etherification agent is a dialkyl sulfate, and the chelate group of the phenolic chelate resin is an amine group.

16. The method of claim 1, wherein the etherification agent is a dialkyl sulfate, and the chelate group of the phenolic chelate resin is a urea group.

* * * * *